(12) United States Patent
Lin et al.

(10) Patent No.: US 6,465,604 B2
(45) Date of Patent: Oct. 15, 2002

(54) PYRIMIDINE DERIVATIVES AS HARDNESS STABILIZERS

(75) Inventors: Horng-Jau Lin, Wadsworth, OH (US); Otto William Maender, Copley, OH (US)

(73) Assignee: Flexsys America L.P., Akron, OH (US)

( * ) Notice: Subject to any disclaimer, the term of this patent is extended or adjusted under 35 U.S.C. 154(b) by 0 days.

(21) Appl. No.: 09/815,239

(22) Filed: Mar. 21, 2001

(65) Prior Publication Data

US 2002/0040080 A1 Apr. 4, 2002

Related U.S. Application Data

(60) Provisional application No. 60/191,055, filed on Mar. 21, 2000.

(51) Int. Cl.$^7$ .............................................. C08G 75/00
(52) U.S. Cl. ...................... 528/373; 528/374; 528/390; 524/100
(58) Field of Search ....................... 524/100, 1; 525/50; 528/367, 368, 373, 374, 390

(56) References Cited

U.S. PATENT DOCUMENTS

| | | | | |
|---|---|---|---|---|
| 3,565,894 A | 2/1971 | D'Amico | ................. | 260/247.1 |
| 3,574,213 A | 4/1971 | D'Amico | ................. | 260/256.5 |
| 3,726,866 A | 4/1973 | D'Amico | ................. | 260/247.1 |
| 3,839,303 A | 10/1974 | D'Amico | ............... | 260/79.5 B |
| 4,085,093 A | * | 4/1978 | Hopper | ....................... 524/168 |
| 4,946,956 A | 8/1990 | Wheeler et al. | ............ | 544/323 |
| 5,068,271 A | 11/1991 | Wheeler et al. | ............ | 524/100 |

OTHER PUBLICATIONS

Kim, Sunggak; Kim, Sung Soo; Synthesis, 1986 (12) 1017–1019.*
Rubber Chemistry and Technology, 1996, vol. 69, Novel Sulfur Vulcanization Accelerators Based on Mercapto–Pyridine, –Pyrazine, And –Pyrimidine, Charles J. Rostek, et al. pp. 180–202.
Rubber Chemistry and Technology, 1987, vol. 60, New Curing System Components, L.H. Davis, et al. pp. 124–139.
Rubber Technology Handbook, 1989, Dr. Werner Hofmann, pp. Preface; 230–231.

* cited by examiner

Primary Examiner—James J. Seidleck
Assistant Examiner—Travis B Ribar
(74) Attorney, Agent, or Firm—Louis A. Morris

(57) ABSTRACT

The invention comprises a vulcanizable composition comprising a sulfur vulcanizable rubber, a sulfur vulcanizing agent, an accelerating agent in an amount effective to accelerate vulcanization and sufficient to not substantially inhibit vulcanization, and an amount effective to improve the hardness stabilization of said rubber upon vulcanization of a pyrimidine derivative. The invention also comprises a method of improving the hardness stabilization of a composition comprising a sulfur vulcanizable rubber by adding the above accelerating agent and pyrimidine derivative to the composition.

16 Claims, No Drawings

PYRIMIDINE DERIVATIVES AS HARDNESS STABILIZERS

CROSS REFERENCE TO RELATED APPLICATION

This application claims priority from Provisional Patent Application 60/191,055, filed Mar. 21, 2000.

BACKGROUND OF THE INVENTION

1. Field of the Invention

The invention relates to a pyrimidine derivative for use in the hardness stabilization of rubber and a method of improving the hardness stabilization of rubber by adding the pyrimidine derivative and associated accelerators to an unvulcanized rubber composition.

2. Discussion of the Prior Art

Vulcanizing rubber compositions by heating a sulfur-vulcanizable rubber composition with sulfur and/or a sulfur donor and a vulcanization accelerator has been known for many years. By this process vulcanizates having acceptable physical properties including tensile strength, resilience, and fatigue resistance can be obtained, but such vulcanizates tend not to have good aging properties. A typical aging phenomenon is hardening, which is explained below.

Uncured as well as cured rubbers are prone to aging effects. The unsaturated groups in diene rubbers, e.g. styrene-butadiene rubber (SBR) or a blend of SBR with natural rubber, butadiene rubber or with both, make it possible to cure with sulfur, but at the same time they exhibit a sensitivity toward oxygen, ozone, and other reactive substances causing changes such as hardening of the vulcanizate. Unaged diene rubbers contain free double bonds that remain sensitive to the above reactive substances even after vulcanization. Higher temperatures make these effects even more noticeable. Also, since unreacted double bonds are present in the rubber vulcanizate, there is the possibility of further reaction with sulfur causing hardening, i.e. additional crosslinking, of the vulcanizate.

The use of antioxidants will retard the oxygen-induced aging of the vulcanizate, but will not affect the increase in hardness due to sulfur-induced crosslinking.

L. H. Davis et al. in *Rubber Chemistry and Technology*, Vol. 60, 1987, 125–139, disclose the use of 2,2'-dithiobispyridine-N-oxide and the zinc salt of pyridine-2-thiol-N-oxide as a primary accelerator alone or in combination with a low amount of a benzothiazole-2-sulfenamide accelerator in the sulfur vulcanization of polyisoprene, e.g., natural, rubber compounds.

U.S. Pat. No. 3,574,213 discloses rubber vulcanization accelerators comprising pyrimidinylthio-phthalazines, particularly 1-(4,6-dimethyl-2-pyrimidinylthio)-phthalazine, that achieve reduction in scorch.

C. J. Rostek et al, in *Rubber Chemistry and Technology*, Vol. 69, 1996, 180–202, disclose the use of novel sulfur vulcanization accelerators based on mercapto-pyridine, -pyrazine, and -pyrimidine. This reference relates to polyisoprene rubbers, which do not harden.

U.S. Pat. No. 3,839,303 discloses the inhibition of premature vulcanization of natural or synthetic diene rubbers by including in the vulcanizable composition accelerating agents, such as thiazole accelerators and a compound comprising certain pyrimidinesulfenamides, such as N-cyclohexyl-4,6-dimethyl-2-pyrimidinesulfenamide. The compound of this reference is formulated so as to be effective in inhibiting premature vulcanization in the vulcanizable composition to which it is added.

U.S. Pat. No. 3,565,894 discloses heterocyclic esters of dithiocarbamic acids wherein the heterocycle contains 3 or 4 carbon atoms and two meta nitrogen atoms and is attached at the carbon between the nitrogen atom, which esters are useful for accelerating the vulcanization of rubber.

SUMMARY OF THE INVENTION

In one embodiment, the present invention comprises a vulcanizable composition comprising a sulfur vulcanizable rubber, a sulfur vulcanizing agent, an accelerating agent and a hardness stabilization agent comprising a pyrimidine derivative of the formula:

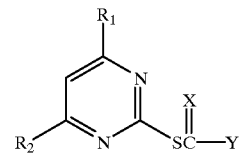

Where X is S, O or NH, Y is N, $SR_3$, or $OR_3$, $R_1$ through $R_4$ are the same or different and selected from the group consisting of the substituents alkyl, cycloalkyl, alkylaryl, aryl and aralkyl, hydrogen, halogen, hydroxy, amino, substituted amino, and substituted carbonyl containing groups, $R_3$ may be a radical derived from a carbon based heterocyclic group containing at least one of S or N, or both S and N, and $R_3$ and $R_4$ may be in the same constituent together with N to form various heterocycles, and $R_3$ may also be a radical derived from heterocyclic groups, and the respective amounts of accelerating agent and hardness stabilization agent being effective to not substantially inhibit vulcanization and to stabilize the hardness property of said rubber upon vulcanization, the respective amounts of accelerating agent and hardness stabilization agent being effective to not substantially inhibit vulcanization and to stabilize the hardness properties of said rubber upon vulcanization, the amount of accelerating agent in said composition being greater than about 0.6 phr when said rubber is SBR rubber, or at least about 0.5 phr when said rubber is natural rubber, and the amount of hardness stabilization agent being at least about 0.5 phr.

In a second embodiment, the present invention comprises a method of improving the hardness stabilization of rubber which includes adding the above composition to an unvulcanized rubber composition followed by vulcanization of the rubber composition.

Other embodiments of the invention encompass specific pyrimidine derivatives, accelerators, details about relative amounts of reactants, and unvulcanized rubber compositions, all of which are hereinafter disclosed in the following discussion of each of the facets of the present invention.

DETAILED DISCRIPTION OF THE INVENTION

According to the present invention, it has been found that by adding appropriate amounts of certain pyrimidine derivatives and accelerators to a vulcanizable rubber composition comprising natural rubber or other rubbers, vulcanizates having improved properties can be made, from which, e.g., pneumatic tires can be made. These combinations of accelerators and pyrimidine derivatives have the effect of stabilizing the hardness properties of the rubber vulcanizate, e.g., during the service life of a pneumatic tire, without inhibiting or slowing vulcanization, i.e. increasing "scorch" time, in the production of the tire. Thus, hardness stabilization is achieved without slowing of the vulcanization process, thereby avoiding loss in production efficiency.

In this application, the abbreviation "phr" means the number of parts by weight per 100 parts by weight of rubber. In the case of a rubber blend, it is based on 100 parts by weight of total rubber.

Either natural rubber (NR), styrene-butadiene rubber (SBR) or a blend of NR and SBR or NR and SBR with one or more other rubbers can be used in the invention process, it being understood that for purposes of this invention the term "rubber" means an elastomer containing a hydrocarbon unit which is a polymer with some unsaturated chemical bonds. Typically, SBR, a blend of SBR with natural rubber (NR), a blend of SBR with polybutadiene rubber or butadiene rubber (BR), or a blend of SBR with NR and BR is used. The type of rubber or mixture of rubbers will have some affect on the precise amounts of accelerator and pyrimidine derivative appropriate to achieve hardness stabilization without inhibition of the vulcanization.

Typically, the amount of pyrimidine derivative hardness stabilizing agent employed in the process of the present invention will be from at least about 0.5 phr to preferably about 10.0 phr. and most preferably about 3.0 phr.

In the presence of the present invention sulfur and/or a sulfur vulcanizing agent is employed. The amount of sulfur to be compounded with the rubber usually is 0.1 to 10 phr, preferably in excess of about 1 phr. If a sulfur donor is used the amount thereof should be calculated in terms of the amount of sulfur.

Typical examples of sulfur donors that can be used in the process of the present invention include dithiodimorpholine, caprolactam disulfide, tetramethylthiuram disulfide, and dipentamethylenethiuram tetrasulfide. The reader is referred to W. Hofmann, *Rubber Technology Handbook*, Hanser Publishers, Munich 1989, in particular pages 231–233.

Particularly preferred pyrimidine derivatives for us in the composition and method of the present invention have the following chemical structural formulas:

PD1: 4,6-Dimethyl-2-pyrimidyl-N,N-dimethyldithiocarbamate. CAS registration number is [32595-22-5]

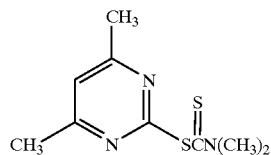

PD2: S-(4,6-Dimethyl-2-pyrimidyl)-N-n-butylthiocarbamate.
CAS registration number is [61887-72-7] Reference: H. Voigt, D. Heydenhauss, F. Hofmann, G. Jaenecke and L. Meister, *Z. Chem.*, 16, 397 (1976); cited by *Chem. Abstr.*, 86, 89743r (1977).

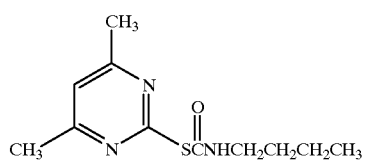

PD3: S,S-Bis(4,6-dimethyl-2-pyrimidyl) dithiocarbonate.
CAS registration number is [61887-68-1] Reference:

Same as PD2. (See above)

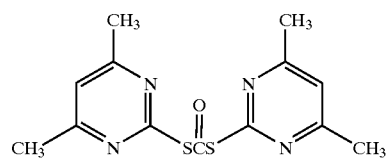

PD4: Bis(4,6-dimethyl-2-pyrimidyl) trithiocarbonate (see Example 1 for synthesis)

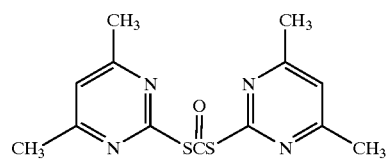

The alkyl, cycloalkyl, aryl and aralkyl groups of the above formula I preferably have from 2 to about 15 carbon atoms and most preferably 2 to about 8. A preferred $R_3$ comprises 2-pyrimidine.

Vulcanization accelerators appropriate for use in the invention include benzothiazole-based accelerators, particularly 2,2'-dithiobis(benzothiazole) (MBTS), mercaptobenzothiazoles, thiophosphoric acid derivatives, thiurams, dithiocarbamates, diphenylguanidine (DPG), di-o-tolyl guanidine, xanthates, sulfenamides and mixtures of one or more of these accelerators.

The amount of accelerating agent employed when the rubber in the vulcanizable composition is SBR is greater than about 0.6 phr, and when the composition comprises natural rubber, at least about 0.5 phr. The upper limit in either case is preferably about 10.0 phr and most preferably about 3.0 phr.

Particularly effective sulfur-vulcanizable rubber compositions in accordance with the present invention include a composition comprising styrene-butadiene rubber, one or more of the above preferred pyrimidine derivatives, PD1, PD2, PD3, or PD4, and a mixture of the accelerators N,N-diphenylguanidine, N-t-6Butyl-2-benzothiazolesulfenamide, 2,2'-dithiobis(benzothiazole) and, sometimes, 2,2'-dithiobis(4-methylbenzothiazole). We have found that with SBR, the amount of accelerator should be greater than about 0.6 phr of accelerator, and for natural rubber at least about 0.5 phr of accelerator. Natural rubber has more reactive allylic sites for crosslinking than SBR and generally requires less accelerator for efficient crosslinking.

It may be effective, in lieu of directly providing a pyrimidine derivative of formula I in the composition of the invention, to provide precursors of such derivatives that lead to the formation of such derivatives, in situ.

Conventional rubber additives may also be included in the sulfur-vulcanizable rubber composition in accordance with the present invention. Examples include reinforcing agents such as carbon black, silica, clay, whiting and other mineral fillers, processing oils, tackifiers, waxes, phenolic antioxidants, phenylenediamine antidegradants, antiozonants, pigments, e.g. titanium dioxide, resins, plasticizers, factices, and vulcanization activators, such as stearic acid and zinc oxide. These conventional rubber additives may be added in amounts known to the person skilled in the art of rubber compounding. The reader is also referred to the examples that are described below.

For further details on these typical rubber additives and vulcanization inhibitors, see W. Hofmann, *Rubber Technology Handbook*, Hanser Publishers, Munich 1989.

Finally, in specific applications it may also be desirable to include steel-cord adhesion promoters such as cobalt salts and dithiosulfates in conventional, known quantities.

The sulfur vulcanization process of the present invention can be carried out using means and equipment that are well known to a person skilled in the art. Suitable vulcanization procedures are described in W. Hofmann, *Rubber Technology Handbook,* Hanser Publishers, Munich 1989.

A typical method comprises preparing a masterbatch consisting of rubber, carbon black, a vulcanization activator, and a processing oil, in an internal mixer such as a Banbury mixer or a Werner & Pfleiderer mixer, and subsequently adding a vulcanization system comprising sulfur and a vulcanization accelerator, and the hardness stabilizing pyrimidine derivative in accordance with the present invention to the masterbatch either in a low temperature mixer or on a two-roll mill, i.e. the productive stage of mixing. The uncured rubber composition is then vulcanized by heating, e.g., in a compression mold.

The invention vulcanization process typically is carried out at a temperature of 110–200, preferably 120–190, more preferably 140–180° C. for a period of time of up to 12, preferably up to 6, more preferably up to 3 hours.

The composition of the present invention is useful in the manufacture of many articles, including pneumatic tires, e.g., for passenger cars and trucks, and industrial rubber goods, which comprise the rubber vulcanizate obtained by the method of the invention. The invention is illustrated by the following examples.

EXAMPLES

Example 1

This example illustrates the syntheses of PD4, bis(4,6-dimethyl-2-pyrimidyl) trithiocarbonate. To a stirred suspension of sodium 4,6-dimethyl-2-pyrimidinethiolate (7.1 g) in toluene (50 ml) was added thiophosgene (2.3 g) at room temperature over ten minutes. Stirring was continued for an hour. It was filtered and the filtrate was evaporated under reduced pressure to give 5.8 g of the product: mp 126-7 C.

Example 2

A masterbatch of rubber, carbon black, stearic acid, zinc oxide, processing oil, and antidegradant was made in an internal mixer. The sulfur, accelerators, and hardness stabilizers were mixed on a two-roll mill at approx. 50–70° C. Rubber compounds were vulcanized by compression molding at 145° C. for a period of time equal to $1.7 \times t_{90}$. After cooling the vulcanized rubber sheets for 24 h, test pieces were cut and analyzed.

The rheological properties were determined on a Monsanto Rheometer MDR2000E, arc 0.5°, 145° C./60 min. Scorch time (t5) is the time to increase the torque 5 Mu, above the minimum torque ($M_L$). Optimum vulcanization time ($t_{90}$) is the time at 90% of the maximum torque ($M_H$). $T_{end}$ is the time at the rheometer and is set at 1 h. Delta torque (Delta S) is the difference between the minimum and the maximum torque. The slope of a rheogram between $M_L$ and $M_H$ is a measure of the cure rate (RH). Hysteresis is the percentage of energy lost per cycle of deformation. The ratio of loss modulus to storage modulus is defined as mechanical loss and this corresponds to tangent delta (tan d).

The rubber test pieces were aged in a hot air circulation oven for 3 days (72 h) at 100° C. to simulate hardening during use, for example, as a tire.

The hardness stabilization characteristics were determined by calculating the so-called modulus stabilization (MS).

The modulus stabilization is the ratio of the modulus at elongation 200% (Mod 200) of the aged and the unaged rubber test pieces and is expressed as a percentage by multiplying this ratio by 100%. The lower the ratio $Mod200_{aged}/Mod200_{unaged}$, the better the modulus retention or hardness stabilization. The Mod200 was obtained from tensile stress-strain tests which were performed in accordance with ISO 37-1994 (dumb-bell type 2).

The masterbatch employed in the compositions was compounded as shown in Table 1. The various Stocks comprised the compositions as shown in Table 2, each Stock containing one of the above preferred pyrimidine derivatives and control Stocks not containing pyrimidine derivative. The rheological properties and modulus stabilization (an indication of the hardness stabilizing effect of a pyrimidine derivative) is shown in Table 3.

There were three control Stocks, 1A, 1B and 1C. The compositions of all three control Stocks are indicated in Table 2 to be the same, but when preparing blends of masterbatches and additives there are always slight variations in the preparation or laboratory procedures that precludes exact reproducibility. Stocks 2 and 3 were both prepared by the addition of hardness stabilizer to the same Stock 1A, so they are compared to Stock 1A. Stock 4 was based on Stock 1B, so its comparison is with Stock 1B. Stocks 5 and 6 were based on Stock 1C, so their comparison is with Stock 1C.

TABLE 1

| Masterbatch | |
|---|---|
| | phr |
| SBR | 137.5 |
| N-220[1] | 60.0 |
| 6PPD[2] | 1.0 |
| Stearic acid | 2.0 |
| Zinc oxide | 3.0 |
| Total | 203.5 |

[1]Carbon black
[2]N-(1,3-Dimethylbutyl)-N'-phenyl-p-phenylenediamine

TABLE 2

| | Stock Compositions | | | | | |
|---|---|---|---|---|---|---|
| Stock # | 1A, 1B & 1C | 2 | 3 | 4 | 5 | 6 |
| Masterbatch HS | 203.5 | 203.5 | 203.5 | 203.5 | 203.5 | 203.5 |
| Sulfur | 1.8 | 1.8 | 1.8 | 1.8 | 1.8 | 1.8 |
| DPG[3] | 0.3 | 0.3 | 0.3 | 0.3 | 0.3 | 0.3 |
| TBBS[4] | 0.8 | 0.8 | 0.8 | 0.8 | 0.8 | 0.8 |
| MBTS[5] | 0.2 | 0.2 | 0.2 | 0.2 | 0.2 | 0.2 |
| PD1 | | 1.0 | 3.0 | | | |
| PD2 | | | | 1.00 | | |
| PD3 | | | | | 1.0 | |
| PD4 | | | | | | 1.0 |

[3]N,N-Diphenylguanidine
[4]N-t-Butyl-2-benzothiazolesulfenamide
[5]2,2'-Dithiobis(benzothiazole)

TABLE 3

Rheological properties at 145° C./60 min and Modulus Stabilization
(refer to Table 2 for Stock compositions)

| Stock No. | 1A (for Stocks 2 and 3) | 2 | 3 | 1B (for Stock 4) | 4 | 1C (for Stocks 5 and 6) | 5 | 6 |
|---|---|---|---|---|---|---|---|---|
| Scorch Test | | | | | | | | |
| t5 @ 135° C. (min) | 14.36 | 14.09 | 11.92 | 11.96 | 9.99 | 14.90 | 10.25 | 10.43 |
| t35 @ 135° C. (min) | 18.51 | 17.07 | 14.10 | 15.77 | 13.12 | 19.59 | 13.76 | 13.20 |
| Min. Visc. (mu) | 39.24 | 38.37 | 36.68 | 37.75 | 38.59 | 38.15 | 38.25 | 37.08 |
| Rheometer @ 145° C. | | | | | | | | |
| Rmax (dNM) | 13.86 | 15.24 | 17.60 | 13.07 | 13.27 | 13.75 | 13.14 | 13.97 |
| Rmin (dNm) | 2.33 | 2.34 | 2.25 | 2.16 | 2.18 | 2.21 | 2.21 | 2.20 |
| Rmax-Rmin (dNM) | 11.53 | 12.50 | 15.35 | 10.91 | 11.09 | 11.54 | 10.93 | 11.77 |
| t2 (min) | 10.09 | 9.56 | 7.62 | 8.29 | 8.88 | 10.19 | 7.30 | 7.55 |
| t25 (min) | 11.02 | 10.47 | 8.30 | 8.93 | 7.24 | 10.98 | 8.14 | 8.31 |
| t90 (min) | 27.80 | 21.10 | 24.27 | 23.47 | 19.29 | 25.41 | 26.76 | 26.86 |
| Peak Rate(dNM/m) | 1.0 | 1.8 | 3.3 | 1.2 | 1.9 | 1.30 | 1.2 | 1.50 |
| | | | (Cured @ 145° C., 1.7 × t90) | | | | | |
| Stress-Strain Data | | | | | | | | |
| A. Unaged | | | | | | | | |
| 1. Tensile (Mpa): | | | | | | | | |
| Modulus, 100% | 1.51 | 1.71 | 2.18 | 1.63 | 1.57 | 1.54 | 1.57 | 1.59 |
| Modulus, 200% | 3.90 | 4.76 | 6.42 | 4.47 | 4.51 | 3.98 | 4.25 | 4.36 |
| Modulus, 300% | 8.08 | 9.45 | 11.96 | 9.05 | 9.20 | 8.12 | 8.60 | 8.83 |
| Ultimate Tensile | 25.94 | 25.76 | 22.12 | 27.75 | 28.32 | 27.52 | 13.77 | 18.86 |
| 2. Elongation (%): | | | | | | | | |
| Ultimate Elongation | 636 | 589 | 466 | 644 | 614 | 687 | 443 | 464 |
| B. Aged | | | | | | | | |
| 24 hrs | | | | | | | | |
| 1. Tensile (Mpa): | | | | | | | | |
| Modulus, 100% | 2.24 | 2.27 | 2.99 | 2.29 | 2.11 | 2.25 | 2.12 | 2.26 |
| Modulus, 200% | 6.16 | 6.46 | 8.77 | 6.69 | 6.40 | 6.50 | 6.13 | 6.66 |
| Modulus, 300% | 11.49 | 12.01 | 15.26 | 12.29 | 12.08 | 11.96 | 11.15 | 12.18 |
| Ultimate Tensile | 24.67 | 22.6 | 18.12 | 25.92 | 24.61 | 24.37 | 12.60 | 16.26 |
| 2. Elongation (%): | | | | | | | | |
| Ultimate Elongation | 526 | 473 | 341 | 535 | 512 | 525 | 341 | 374 |
| 72 hrs | | | | | | | | |
| 1. Tensile (Mpa): | | | | | | | | |
| Modulus, 100% | 2.83 | 2.85 | 3.22 | 2.91 | 2.66 | 2.84 | 2.40 | 2.66 |
| Modulus, 200% | 7.93 | 8.00 | 9.44 | 8.33 | 7.76 | 7.88 | 6.72 | 7.6 |
| Modulus, 300% | 13.73 | 13.91 | 16.17 | 14.37 | 13.71 | 13.44 | 11.44 | 13.23 |
| Ultimate Tensile | 22.61 | 22.98 | 19.38 | 21.38 | 21.50 | 23.03 | 12.05 | 15.85 |
| 2. Elongation (%): | | | | | | | | |
| Ultimate Elongation | 454 | 446 | 340 | 418 | 433 | 470 | 323 | 349 |
| Modulus Stability(MS) (based on 200% Modulus) | | | | | | | | |
| MS24*, % | 158 | 136 | 137 | 150 | 142 | 163 | 144 | 153 |
| MS72, % | 203 | 168 | 147 | 186 | 172 | 198 | 158 | 174 |

*MS24 and MS72 represent MS at 24 and 72 hours aging, respectively.

The data in Table 3, shows Stocks 2, 3, 4, 5 and 6 achieving no significant inhibition of vulcanization (see Rmax, t2, t25 and t90) as compared to their respective control Stocks, and also enhanced hardness stabilization (see Modulus Stability MS24 and MS72).

What is claimed is:

1. A vulcanizable composition comprising a sulfur vulcanizable rubber, a sulfur vulcanizing agent an accelerating agent and a hardness stabilization agent comprising a pyrimidine derivative of the formula:

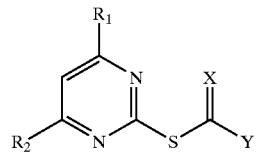

I where X is S, O or NH, Y is $SR_3$, or $OR_3$, $R_1$ through $R_3$ are the same or different and selected from the group consisting of the substituents alkyl, cycloalkyl, alkylaryl, aryl and aralkyl, hydrogen, halogen, hydroxy, amino, substituted amino, and substituted carbonyl containing groups, $R_3$ may be a radical derived from a carbon based heterocyclic group containing at least one of S or N, or both S and N, and the respective amounts of accelerating agent and hardness stabilization agent being effective to not substantially inhibit vulcanization and to stabilize the hardness property of said rubber upon vulcanization, the amount of accelerating agent in said composition being greater than about 0.6 phr when said rubber is SBR rubber, or at least about 0.5 phr when said rubber is natural rubber, and the amount of hardness stabilization agent being at least about 0.5 phr.

2. The composition of claim 1 wherein said accelerating agent is selected from the group consisting of mercaptobenzothiazoles, 2,2'-dithiobis(benzothiazole), thiophosphoric acid derivatives, thiurams, dithiocarbamates, diphenylguanidine, di-o-tolyl guanidine, xanthates, sulfenamides and mixtures thereof.

3. The composition of claim 1 wherein said accelerating agent comprises 2,2'-dithiobis(benzothiazole).

4. The composition of claim 1 wherein the amount of said sulfur vulcanizing agent is provided in excess of about 1 parts per hundred of rubber in said composition.

5. The composition of claim 1 wherein the compound of formula I has the formula

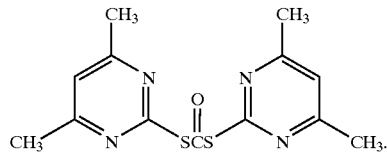

6. The composition of claim 1 wherein the compound of formula I has the formula

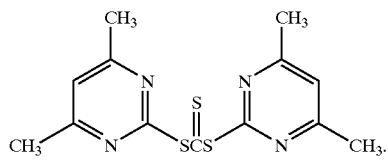

7. The composition of claim 1 wherein the amount of said compound of formula I is from at least about 0.5 phr to about 10.0 phr.

8. The composition of claim 1 wherein the amount of said compound of formula I is from at least about 0.5 phr to about 3.0 phr.

9. The composition of claim 1 comprising SBR rubber and about 0.6 phr to about 10.0 phr of accelerating agent.

10. The composition of claim 1 comprising SBR rubber and about 0.6 phr to about 3.0 phr of accelerating agent.

11. The composition of claim 1 comprising natural rubber and from at least about 0.5 phr to about 10.0 phr of accelerating agent.

12. The composition of claim 1 comprising natural rubber and from at least about 0.5 phr to about 3.0 phr of accelerating agent.

13. The composition of claim 1 wherein said alkyl, cycloalkyl, aryl and aralkyl groups have from 2 to about 15 carbon atoms.

14. The composition of claim 1 wherein said alkyl, cycloalkyl, aryl, alkylaryl and aralkyl groups have from 2 to about 8 carbon atoms.

15. The composition of claim 1 wherein $R_3$ comprises 2-pyrimidine.

16. A method of improving the hardness stabilization of rubber by adding to unvulcanized sulfur vulcanizable rubber a composition comprising a sulfur vulcanizing agent, an accelerating agent and a hardness stabilization agent comprising the pyrimidine derivative of claim 1.

* * * * *